(12) United States Patent
Baxter et al.

(10) Patent No.: US 8,997,793 B2
(45) Date of Patent: Apr. 7, 2015

(54) FLEXIBLE CONDUIT FOR USE IN FRESH AIR INTAKE AND GAS VAPOR OUTLET INCORPORATED INTO A VEHICLE FUEL TANK TO ELIMINATE WHISTLING WITHIN THE CONDUIT

(75) Inventors: Kevin Charles Baxter, Goodrich, MI (US); Theodore Castleberry, Sterling Heights, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 421 days.

(21) Appl. No.: 13/495,121

(22) Filed: Jun. 13, 2012

(65) Prior Publication Data

US 2012/0318395 A1    Dec. 20, 2012

Related U.S. Application Data

(60) Provisional application No. 61/497,337, filed on Jun. 15, 2011.

(51) Int. Cl.

| F16L 55/027 | (2006.01) |
|---|---|
| F16L 11/11 | (2006.01) |
| F16L 11/118 | (2006.01) |
| F16L 55/033 | (2006.01) |
| F02M 37/20 | (2006.01) |
| F02M 25/08 | (2006.01) |

(52) U.S. Cl.
CPC ............ *F16L 11/111* (2013.01); *F16L 11/118* (2013.01); *F16L 55/033* (2013.01); *F02M 37/20* (2013.01); *F02M 25/089* (2013.01)

(58) Field of Classification Search
CPC ..... F16L 55/033; F16L 16/111; F16L 16/118; F16L 55/04; F02M 37/20; F02M 25/089

USPC .................. 138/121, 122, 173, 177; 181/207
See application file for complete search history.

(56) References Cited

U.S. PATENT DOCUMENTS

| 3,234,969 | A | * | 2/1966 | Cliffor Du Mont ........... 138/121 |
|---|---|---|---|---|
| 4,712,642 | A | * | 12/1987 | Lalikos et al. ................ 181/207 |
| 4,756,045 | A | * | 7/1988 | Gans et al. .................... 15/300.1 |
| 4,793,384 | A | * | 12/1988 | Lalikos et al. ................ 138/121 |
| 5,934,260 | A |  | 8/1999 | Gadkaree et al. |
| 6,135,158 | A | * | 10/2000 | Kraus ............................ 138/109 |
| 7,699,042 | B2 |  | 4/2010 | Steinman et al. |
| 7,980,229 | B2 |  | 7/2011 | Menke |
| 8,156,924 | B2 |  | 4/2012 | Hudak et al. |
| 8,201,579 | B2 |  | 6/2012 | Schmid et al. |
| 8,225,811 | B1 |  | 7/2012 | Lieber |
| 8,295,692 | B2 |  | 10/2012 | McClanahan et al. |
| 8,327,830 | B2 |  | 12/2012 | Makino et al. |
| 8,376,053 | B2 |  | 2/2013 | Obrejanu |
| 8,391,696 | B2 |  | 3/2013 | McClanahan et al. |
| 2010/0300569 | A1 | * | 12/2010 | Degen et al. .................. 138/121 |
| 2012/0325323 | A1 |  | 12/2012 | Richard et al. |

* cited by examiner

*Primary Examiner* — J. Casimer Jacyna
(74) *Attorney, Agent, or Firm* — Gifford, Krass, Sprinkle, Anderson & Citkowski, P.C.; Douglas J. McEvoy

(57) ABSTRACT

A tubing incorporated into a vehicle fuel tank system including an elongated and flexible tubular shaped body having a hollow interior exhibiting pluralities of alternating inner and outer diameter spaced locations. The inner diameter locations exhibit a first plurality of annularly projecting ribs, the outer diameter locations exhibiting a second plurality of ribs exhibiting a larger dimension. In this fashion, a plurality of individual tubing sections are incorporated into each of gas vapor (outflow) vent lines and fresh intake air (inflow) lines such that an inner airflow profile is established within the body to retard the generation of sound associated with volumetric airflow.

10 Claims, 2 Drawing Sheets

FLEXIBLE CONDUIT FOR USE IN FRESH AIR INTAKE AND GAS VAPOR OUTLET INCORPORATED INTO A VEHICLE FUEL TANK TO ELIMINATE WHISTLING WITHIN THE CONDUIT

CROSS REFERENCE TO RELATED APPLICATIONS

The present application claims the priority of U.S. Ser. No. 61/497,337 filed Jun. 15, 2011

FIELD OF THE INVENTION

The present invention is directed to flexible tubing or conduit incorporated into a vehicle fuel tank architecture. More specifically, the present invention discloses a modified tubing design which incorporates pluralities of alternating inner and outer diameter spaced locations, the inner diameter locations exhibiting first modestly dimensioned ribs, with the outer diameter locations enhanced dimensioned ribs. The inner flow profile of the tubing prevents the generation of sound associated with volumetric airflow, such as in a range of 1-30 cubic feet per minute (CFM) through the tube and which can further be incorporated into each of gas vapor (outflow) vent lines and fresh intake air (inflow) lines.

DESCRIPTION OF THE RELEVANT ART

The prior art is well documented with examples of venting technology such as employed with a vehicle gas tank and in order to establish and maintain positive pressure within the line to permit nominal fluid flow. A problem with such venting lines is the generation of resonant noises such as whistling resulting from higher airflow rates.

SUMMARY OF THE PRESENT INVENTION

The present invention disclose a tubing incorporated into a vehicle fuel tank system including an elongated and flexible tubular shaped body having a hollow interior exhibiting pluralities of alternating inner and outer diameter spaced locations. The inner diameter locations exhibit a first plurality of ribs, the outer diameter locations exhibiting a second plurality of ribs. In this fashion, an inner airflow profile is established within the body retarding the generation of sound associated with volumetric airflow.

Additional features include each of the pluralities of ribs projecting annularly outwardly, with the first plurality of ribs exhibiting a smaller dimension and the second plurality of ribs a larger dimension. A plurality of individual tubing sections incorporated into each of gas vapor (outflow) vent lines and fresh intake air (inflow) lines.

Other features include an inner flow profile of the body preventing the generation of sound associated with volumetric airflow, such as in a range of 1-30 cubic feet per minute (CFM). The inner diameter locations associated with the body are further provided in a range of between 4 mm to 50 mm.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 2:
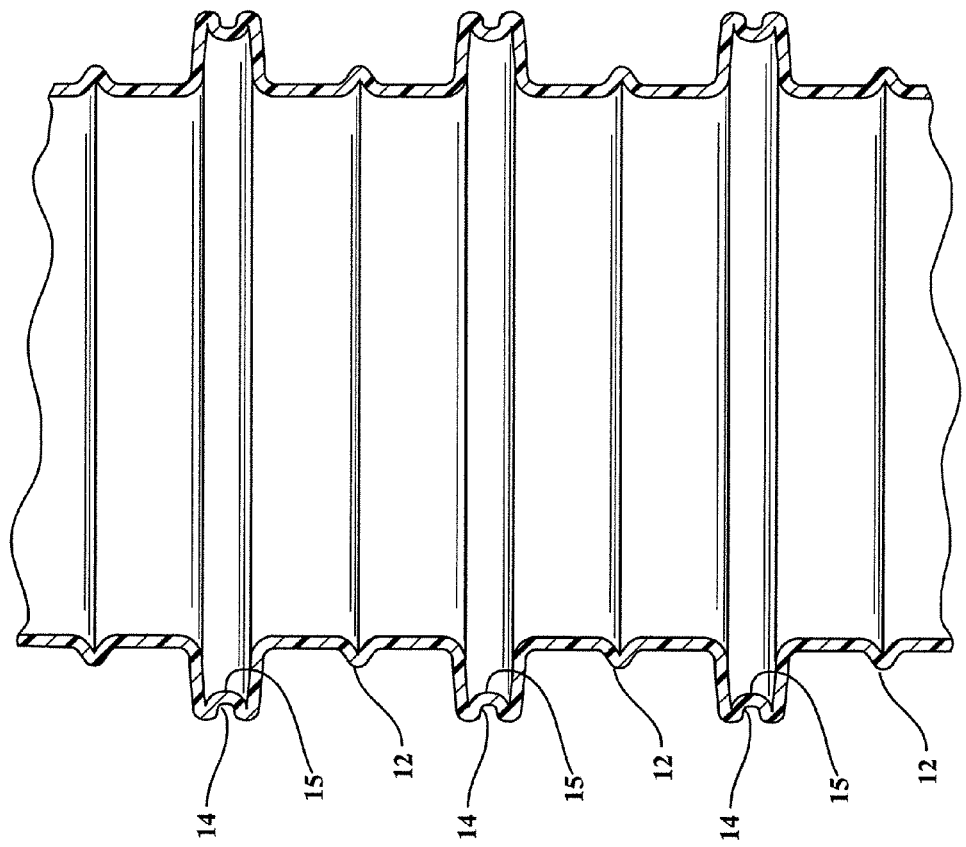
FIG. 2 is a partial cutaway view of the tubing and which illustrates first and second alternating pluralities of ribs arranged at inner and outer alternating and annular extending locations associated with the tubing.
Figure 1:
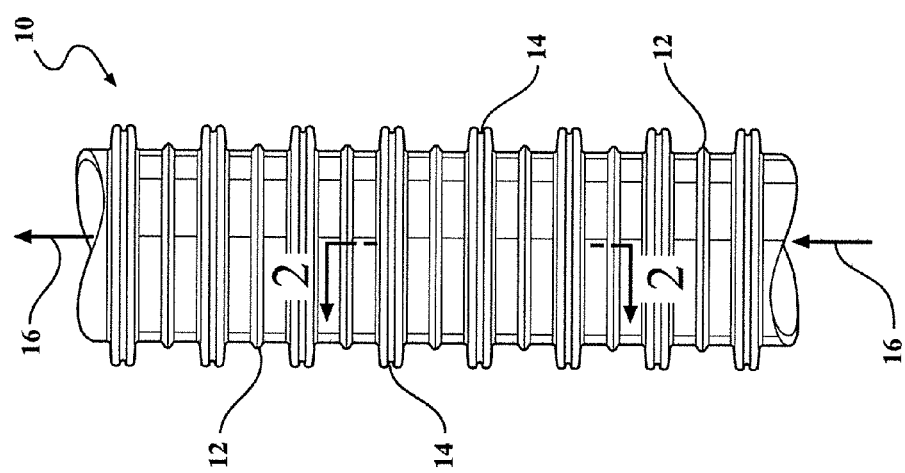
FIG. 1 is a plan view of a length of tubing according to the invention.

Referencing FIGS. 1 and 2, the present invention discloses a modified tubing design, as generally shown at 10. As will be described, the tubing 10 is constructed as a flexible conduit which extends through associated sections of a fuel system and in particular for providing both fresh air inflow (intake) and gas vapor outflow (venting).

The tubing includes a body 10 constructed of a flexible and polymeric material and incorporates, in annular extending and spatially arrayed fashion, pluralities of first and second alternating (inner 12 and outer 14) diameter spaced locations. Additional material considerations are contemplated and which can include the use of a wide range of polymeric or plastic/elastomer composites.

As additionally shown in the partially cutaway view of FIG. 2, the first diameter locations 12 exhibit modestly dimensioned and outwardly annularly projecting ribs, with the (alternating) second diameter locations 14 further exhibiting enhanced and outwardly projecting and dimensioned ribs, such as best illustrated in FIG. 2 and each including inner recess defining surfaces as shown at 15. In use, it is found that the added enhanced rib on the (relatively) inner diameter locations 12 both improves material distribution as well as air flow capacity within the tubing, regardless of the relative direction of such flow.

The geometry of the inner flow profile of the tubing is further designed as to prevent the generation of resonant whistling or like sounds associated with volumetric airflow, depicted in FIG. 1 by directional arrow 16 in a range of 1-30 cubic feet per minute (CFM) through the tube, and which can further be incorporated into each of gas vapor (outflow) vent lines and fresh intake air (inflow) lines. It is specifically noted that the geometry established in the relation between the alternating first (relatively inner diameter or ID) 12 and second relative outer diameter (OD) 14 locations and the associated pitch (see as best shown in partial linear cutaway of FIG. 2) result in the reduction or outright elimination of whistling sounds from within the tubing and which otherwise result from the internal airflow in either direction to or from the gas tank and such as at flow rates exceeding 3 CFM.

The enhanced rib incorporated into each annular extending and internal dimension (inner diameter) location 12 is provided both to improve material distribution and to enhance airflow capacity within the tubing. The alternating recessed rib construction incorporated into the outer diameter geometry, again at alternating locations 14, further aids in eliminating whistling within the tubing and it is further envisioned and understood that the configuration of the inner tubing wall as best depicted in FIG. 2 can be modified to address any specific configuration or application, this including any one or more of reconfiguring the relative dimensions of the first 12 and second 14 alternating projections, modifying the placement sequence of the respective projections such that they need not specifically repeat in an absolute alternating arrangement and/or reconfiguring the inner conduit (arcuate) wall surface depictions 15 associated with second/outer projecting rib locations 14, such as further to exhibit any other angle, slant or profile consistent with the desired performance parameters of the tubing.

In use, the geometry incorporated into the flexible tubing can be used in diameters ranging from 4 mm to in excess of 50 mm ID (with the corresponding outer diameter locations being of any incrementally greater dimension) and such that the tubing will not generated any sound (including whistling) as internal air flow is either pushed or pulled therethrough. In this fashion, the plastic tubing design provides higher airflow while retaining good flexibility.

Figure 3:
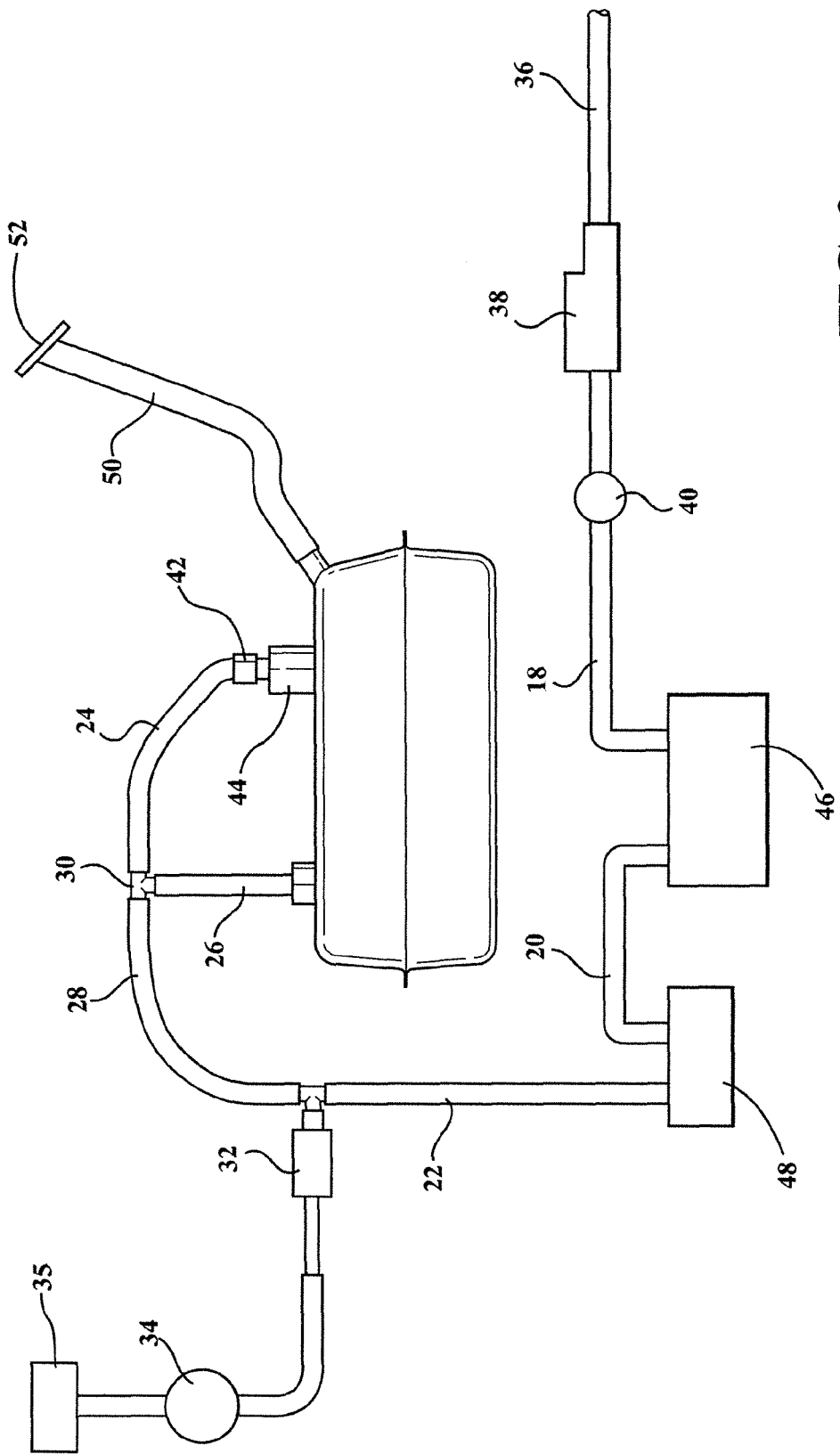
FIG. 3 is a schematic view of vent and vapor lines incorporated into a fuel system.

Referring finally to FIG. 3, a schematic view is shown of vent and vapor lines incorporated into a fuel system and which incorporate the tubing geometry associated with the present invention. As depicted, this includes the application of the tubing to either or both of the fresh air intake lines 18, 20 and 22 (depicted in series) and gas vapor vent outlet lines, at 24 and 26 in direct communication with a vehicle fuel tank 25 and feeding a common vent line 28 via a tee connection 30).

A further tee and connector, see at 32, communicates with opposing extending ends of the fresh air tubing section 22 and common vent tubing section 28 and prior to discharging any vapor through a purge tube and connector hose and into a vapor management vale (at 34) which is also communicated by an intake manifold 35. The intake flow lines 18-22 are further communicated, at an in-feed side, by a separate fresh air inlet 36, dust filter 38, and carbon canister vent valve 40, also arranged in series.

According to the depicted variant, the vapor outlet line 24 connects to a fuel tank pressure sensor 42 in turn mounted atop a connector hose or fitting and within which is integrally formed a fill limit vent valve 44. Other depicted features include an upper evaporation canister 46 interconnecting 18 and 20, with a successive lower evaporation canister 46 likewise interconnecting lines 20 and 22, such as to successively remove excess moisture from the intake air before admittance into the fuel tank 25 so as to maintain proper (positive) pressure to permit continuous and orderly fuel withdrawal according to the normal functioning of the assembly. Finally depicted at 50 is a fill hose extending from the tank 25 and terminating, at an uppermost end, at an operator accessible fill orifice 52.

Having described our invention, other and additional embodiments will become apparent to those skilled in the art to which it pertains and without departing from the scope of the appended claims.

We claim:

1. A tubing incorporated into a vehicle fuel tank system, comprising:
   an elongated and flexible tubular shaped body having an enclosing wall defining a hollow interior, said wall exhibiting, in cross sectional cutaway., pluralities of alternating inner and outer diameter spaced locations;
   said inner diameter locations including a first plurality of outwardly protruding and annularly extending ribs, said first plurality of ribs each further having a substantially "V" profile;
   said outer diameter locations exhibiting a second plurality of ribs annularly projecting outwardly beyond said first ribs, each of said second plurality of ribs including a pair of substantially radially outwardly extending and spaced apart sidewalls terminating in an inwardly concave end surface, said sidewalls and concave end surface defining an annular pocket projecting outwardly from said wall, said second plurality of ribs each further exhibiting greater linear and radial dimensions than said first plurality of ribs; and
   said alternating arrangement of first and second pluralities of ribs interacting with an inner airflow profile established within said body to retard the generation of sound associated with the airflow.

2. The invention as described in claim 1, further comprising a plurality of individual tubing sections incorporated into each of gas vapor outflow and fresh air intake inflow lines.

3. The invention as described in claim 1, further comprising the inner airflow profile of said body preventing the generation of sound associated with the airflow, in a range of 1-30 cubic feet per minute.

4. The invention as described in claim 1, further comprising said inner diameter locations associated with said body being provided in a range of between 4 mm to 50 mm.

5. A tubing incorporated into a vehicle fuel tank system, comprising:
   an elongated and flexible tubular shaped body having an enclosing wall defining a hollow interior and exhibiting, in cross sectional cutaway, pluralities of alternating inner and outer diameter spaced locations, said inner diameter locations associated with said body being provided in a range of between 4 mm to 50 mm;
   said inner diameter locations including a first plurality of outwardly protruding and annularly extending ribs, said first plurality of ribs each further having a substantially "V" profile;
   said outer diameter locations exhibiting a second plurality of ribs annularly projecting outwardly beyond said first ribs, each of said second plurality of ribs including a pair of substantially radially outwardly extending and spaced apart sidewalls terminating in an inwardly concave end surface, said sidewalls and concave end surface defining an annular pocket projecting outwardly from said wall, said second plurality of ribs each further exhibiting greater linear and radial dimensions than said first plurality of ribs; and
   said alternating arrangement of first and second pluralities of ribs interacting with an inner airflow profile established within said body to retard the generation of sound associated with the airflow.

6. The invention as described in claim 5, further comprising a plurality of individual tubing sections incorporated into each of gas vapor outflow and fresh air intake inflow lines.

7. The invention as described in claim 5, further comprising the inner airflow profile of said body preventing the generation of sound associated with the airflow in a range of 1-30 cubic feet per minute.

8. A tubing incorporated into a vehicle fuel tank system, comprising:
   a plurality of individual tubing sections incorporated into each of gas vapor outflow and fresh air intake inflow lines;
   each of said tubing sections having an elongated and flexible tubular shaped body having an enclosing wall defining a hollow interior, was wall exhibiting, in cross sectional cutaway, pluralities of alternating inner and outer diameter spaced locations;
   said inner diameter locations including a first plurality of outwardly protruding and annularly extending ribs, said first plurality of ribs each further having a substantially "V" profile;
   said outer diameter locations exhibiting a second plurality of ribs annularly projecting outwardly beyond said first ribs, each of said second plurality of ribs including a pair of substantially radially outwardly extending and spaced apart sidewalls terminating in an inwardly concave end surface, said sidewalls and concave end surface defining an annular pocket projecting outwardly from said wall, said second plurality of ribs each further exhibiting greater linear and radial dimensions than said first plurality of ribs; and said alternating arrangement of first and second pluralities of ribs interacting with an inner airflow profile established within said body to retard the generation of sound associated with volumetric airflow within the tubular shaped body.

9. The invention as described in claim 8, further comprising the inner airflow profile of said body preventing the generation of sound associated with the airflow in a range of 1-30 cubic feet per minute.

10. The invention as described in claim 8, further comprising said inner diameter locations associated with said body being provided in a range of between 4 mm to 50 mm.

* * * * *